United States Patent
Mikami (10) Patent No.: US 8,216,985 B2
(45) Date of Patent: Jul. 10, 2012

(54) GREASE COMPOSITION AND GREASE-ENCLOSED BEARING

(75) Inventor: Hidenobu Mikami, Mie (JP)

(73) Assignee: NTN Corporation, Osaka (JP)

( * ) Notice: Subject to any disclaimer, the term of this patent is extended or adjusted under 35 U.S.C. 154(b) by 455 days.

(21) Appl. No.: 12/450,761

(22) PCT Filed: Apr. 25, 2008

(86) PCT No.: PCT/JP2008/058030
§ 371 (c)(1),
(2), (4) Date: Oct. 8, 2009

(87) PCT Pub. No.: WO2008/136386
PCT Pub. Date: Nov. 13, 2008

(65) Prior Publication Data
US 2010/0092118 A1 Apr. 15, 2010

(30) Foreign Application Priority Data

Apr. 27, 2007 (JP) ............... P2007-118458
May 18, 2007 (JP) ............... P2007-133512

(51) Int. Cl.
*C10M 169/04* (2006.01)
*C10M 145/00* (2006.01)
*F16C 19/00* (2006.01)
(52) U.S. Cl. ...................... 508/304; 384/462
(58) Field of Classification Search .............. 508/304; 384/462
See application file for complete search history.

(56) References Cited

U.S. PATENT DOCUMENTS

| 5,128,067 | A | | 7/1992 | Placek |
| 5,497,821 | A | | 3/1996 | Arvedi |
| 5,565,126 | A | * | 10/1996 | Kimura et al. ............. 508/208 |
| 5,636,561 | A | | 6/1997 | Pecorari |
| 7,771,125 | B2 | * | 8/2010 | Hirata et al. ............. 384/527 |

(Continued)

FOREIGN PATENT DOCUMENTS

JP       03-210394 A       9/1991

(Continued)

OTHER PUBLICATIONS

PCT Search Report Dated Jul. 1, 2008.

*Primary Examiner* — Walter D Griffin
*Assistant Examiner* — Vishal Vasisth
(74) *Attorney, Agent, or Firm* — Hedman & Costigan, P.C.; James V. Costigan (57) ABSTRACT

The present invention provides a grease composition capable of effectively preventing a rolling surface of a grease-enclosed bearing from having hydrogen brittleness-caused peeling and the grease-enclosed bearing. The grease composition includes a base grease consisting of a base oil and a thickener and an additive added to the base grease. The additive contains at least an epoxy compound. A mixing ratio of the epoxy compound to 100 parts by weight of the base grease is set to 0.05 to 10 parts by weight. The grease-enclosed bearing using the grease composition includes an inner ring (2) and an outer ring (3); a plurality of rolling elements (4) disposed between the inner ring (2) and the outer ring (3); and a sealing member (6) for covering openings (8a, 8b) disposed at both axial ends of the inner ring (2) and the outer ring (3). The grease composition (7) is enclosed on peripheries of the rolling elements (4).

7 Claims, 4 Drawing Sheets

U.S. PATENT DOCUMENTS

2005/0197259 A1 * 9/2005 Levy .................... 508/168

FOREIGN PATENT DOCUMENTS

| | | |
|---|---|---|
| JP | 05-156275 A | 6/1993 |
| JP | 05-230486 A | 9/1993 |
| JP | 06-057284 A | 3/1994 |
| JP | 06-510486 A | 11/1994 |
| JP | 06-511277 A | 12/1994 |
| JP | 2003-105366 A | 4/2003 |
| JP | 2005-42102 A | 2/2005 |
| WO | WO93/04802 A1 | 3/1993 |
| WO | WO93/12197 A1 | 6/1993 |
| WO | WO 94/10442 A1 | 5/1994 |
| WO | WO94/10443 A1 | 5/1994 |

\* cited by examiner

GREASE COMPOSITION AND GREASE-ENCLOSED BEARING

This application is a 371 of PCT/JP2008/058030, filed Apr. 25, 2008.

TECHNICAL FIELD

The present invention relates to a grease composition and a grease-enclosed bearing, and more particularly to a grease composition for rolling bearings of electric parts and auxiliary machines of a car such as a fan-coupling apparatus, an alternator, an electromagnetic clutch for an air conditioner, an idler pulley, an electromotive fan motor, and the like and rolling bearings for motors; and a grease-enclosed bearing in which the grease composition is enclosed.

BACKGROUND ART

The electric parts and auxiliary machines of the car and motors of industrial machines are demanded to be compact and have high performance and output year by year. Thus the use conditions thereof have become strict. Rolling bearings are used therefor. Grease is mainly used to lubricate them.

Owing to a recent growing demand for development of small cars, lightweight cars, and the improvement of silence, attempts are being made to manufacture smaller and more lightweight electric parts and auxiliary machine parts of cars and make the engine room airtight. On the other hand, there is a growing demand for a high output and a high efficiency for the performance of various apparatuses of the car. Thus the present tendency is to compensate the miniaturization-caused reduction of the output of the electric parts and auxiliary machines of the car provided inside the engine room by rotating them at high speeds.

As examples of rolling bearings for use in the electric parts and auxiliary machines of the car, a rolling bearing for use in the fan coupling apparatus, a rolling bearing for use in the alternator, a rolling bearing for use in the idler pulley are outlined below.

Regarding the fan coupling apparatus, a viscous fluid is sealed inside it. A housing having an air-feeding fan mounted on its peripheral surface is coupled to a rotor directly connected to the engine through a bearing. By utilizing the shear resistance of the viscous fluid which increases and decreases in response to an atmospheric temperature, the fan-coupling apparatus controls the amount of a driving torque transmitted from the engine and the number of rotations of the fan, thereby feeding optimum air corresponding to the temperature of the engine.

Therefore the rolling bearing for use in the fan-coupling apparatus is demanded to have a high heat resistance, grease-sealing performance, and durability so that the rolling bearing withstands a high rotational speed change in the range from 1000 rpm to 10000 rpm in dependence on a fluctuation of the temperature of the engine and in addition withstands very strict environment in which it is driven in summer at a high speed not less than 10000 rpm at a high temperature not less than 180° C.

The alternator for use in the car receives the rotation of the engine and generates electricity, thus supplies an electric power to an electric load of the car and has a function of charging a battery. Therefore the rolling bearing for use in the alternator is demanded to have a high heat resistance, grease-sealing performance, and durability so that the rolling bearing withstands a very strict environment in which it is rotated at a high speed not less than 10000 rpm at a high temperature not less than 180° C.

The idler pulley of the car is used as a belt tensioning part for the driving belt transmitting the engine power to the electric auxiliary machine thereof. The idler pulley has the function of a pulley for imparting a tensile force to the driving belt when the distance between rotating shafts is fixed. The idler pulley has another function of an idler used to change the travel direction of the belt or preventing interference with obstacles to thereby reduce the volume of the engine chamber.

Therefore the rolling bearing for use in the idle pulley is demanded to have a high heat resistance, grease-sealing performance, and durability so that the rolling bearing withstands a very strict environment in which it is rotated at a high speed not less than 10000 rpm at a high temperature not less than 180° C.

As a grease composition preferable for the rolling bearing such as the rolling bearing for use in the electric auxiliary machine of a car which is used at high temperature and rotational speed, a grease composition is known. The grease composition contains 0.5 to 10 wt % of amide-based wax having the property of preventing the base oil from being oxidized and having a melting point not less than 80° C. The base oil has a kinematic viscosity of 20 to 150 mm$^2$/second at 40° C. The grease composition contains the urea-based thickener at 5 to 30 wt % for the entire grease composition (see patent document 1).

In recent years, owing to the strict use condition that the rolling bearing is rotated at a high-speed rotation at a high temperature, a peculiar peeling phenomenon occurs in an early stage of use with the rolling surface of the rolling bearing turning into white in its texture, which has become a problem.

Unlike peeling which occurs in the inside of the rolling surface owing to metal fatigue, the peculiar peeling phenomenon occurs in the rolling surface at a comparatively shallow portion thereof with the rolling surface turning into white in its texture. That is, the peeling phenomenon is a hydrogen brittleness-caused destruction phenomenon.

As a method of preventing the occurrence of the peculiar peeling phenomenon which occurs in the early stage of use with the rolling surface turning into white in its texture, a method of adding a passivating agent to a grease composition is known (see patent document 2). A method of adding bismuth dithiocarbamate thereto is also known (see patent document 3).

But in recent years, at a high temperature, motors of the electric parts and the auxiliary machines of the car and those of the industrial machines are subjected to a frequent change of high-speed drive—sudden deceleration drive—sudden acceleration drive—sudden stop. Thus the use conditions of the rolling bearing have become increasingly strict. Therefore the method of adding the passivating agent to the grease composition and the method of adding the bismuth dithiocarbamate thereto are insufficient for preventing the occurrence of the peeling phenomenon.

Patent document 1: Japanese Patent Application Laid-Open No. 2003-105366

Patent document 2: Japanese Patent Application Laid-Open No. 3-210394

Patent document 3: Japanese Patent Application Laid-Open No. 2005-42102

DISCLOSURE OF THE INVENTION

Problem to be Solved by the Invention

The present invention has been made to deal with the above-described problems. Therefore it is an object of the present invention to provide a grease composition capable of effectively preventing hydrogen brittleness-caused peeling from occurring on a rolling surface in use conditions of a grease-enclosed bearing, particularly use conditions of a rolling bearing for use in electric parts and auxiliary machines of a car and provide the grease-enclosed bearing.

Means for Solving the Problem

The grease composition of the present invention includes a base grease consisting of a base oil and a thickener and an additive added to the base grease. The additive contains at least an epoxy compound. A mixing ratio of the epoxy compound to 100 parts by weight of the base grease is set to 0.05 to 10 parts by weight.

The epoxy compound is added to the base grease to prevent hydrogen brittleness-caused peeling from occurring on a rolling surface of a bearing in which the grease composition is enclosed.

The epoxy compound is at least one epoxy compound selected from among a bisphenol A-type epoxy compound and a bisphenol F-type epoxy compound.

The thickener is a urea-based thickener.

The base oil is at least one oil selected from among alkyldiphenyl ether oil and poly-α-olefin oil.

The above-described grease composition is enclosed in the grease-enclosed bearing of the present invention.

The above-described bearing is used for electric parts and auxiliary machines of a car and rotatably supports a rotational shaft driven by an engine output on a stationary member. The bearing has an inner ring and an outer ring; a plurality of rolling elements disposed between the inner ring and the outer ring; and a sealing member for covering openings disposed at both axial ends of the inner ring and the outer ring. The grease composition is enclosed on peripheries of the rolling elements. The bearing is used for an alternator of the car.

Effect of the Invention

In the grease composition of the present invention, the additive containing at least the epoxy compound is added to the base grease consisting of the base oil and the thickener. Therefore the grease composition is capable of restraining the hydrogen brittleness-caused peculiar peeling from occurring on bearings for use in cars and industrial machines. Therefore the grease composition allows the grease-enclosed bearing to have a long life.

The grease-enclosed bearing of the present invention is capable of effectively preventing the peculiar peeling from occurring on the rolling surface with the rolling surface turning into white in its texture and thus has a long life. Therefore the grease-enclosed bearing of the present invention can be preferably utilized as a rolling bearing for electric parts and auxiliary machines of a car such as a fan-coupling apparatus, an alternator, an electromagnetic clutch for an air conditioner, an idler pulley, an electromotive fan motor, and the like.

EXPLANATION OF REFERENCE SYMBOLS AND NUMERALS

1: grease-enclosed bearing
2: inner ring
3: outer ring
4: rolling element
5: retainer
6: sealing member
7: grease composition
8a, 8b: opening
9: cooling fan
10: case
11: oil chamber
12: stirring chamber
13: partitioning plate
14: port
15: spring
16: bimetal
17: piston
18: drive disk
19: circulation hole
20: drive shaft
21a, 21b: frame
22: rotor
23: rotational shaft of rotor
24: rotor coil
25: stator
26: stator coil
27: pulley
28: pulley body

BEST MODE FOR CARRYING OUT THE INVENTION

As a result of the energetic investigation of the method of effectively preventing the hydrogen brittleness-caused peeling from occurring on the rolling surface of the rolling bearing, a sudden acceleration/deceleration test has been conducted by using the rolling bearing in which the grease composition containing the epoxy compound as an additive is enclosed. As a result, it has been found that the life of the bearing can be prolonged by using the grease composition containing the epoxy compound for the bearing.

It is considered that by adding the epoxy compound to the base grease, a catalytic action takes place on a frictionally worn surface or on a newly generated surface of a metal exposed owing to wear to form a film of an epoxy polymer on the rolling surface of the bearing. It is considered that the film of the epoxy polymer formed on the rolling surface of the bearing restrains the generation of hydrogen caused by the decomposition of the grease composition, thereby preventing the hydrogen brittleness-caused peculiar peeling from occurring and prolonging the life of the rolling bearing. By using the epoxy compound having a predetermined chemical structure and adding the epoxy compound to the base grease at a predetermined mixing ratio, it is considered that without progressing a curing reaction between the epoxy compound and a urea-based thickener, the film of the epoxy polymer is capable of coating the newly generated surface of the metal exposed owing to frictional wear or the like. The present invention has been made on the basis of the above-described findings.

As the epoxy compound to be added to the base grease of the present invention, epoxy compounds generally used as liquid epoxy resin compositions for sealing use and known as epoxy resin components are listed. Solid or liquid epoxy compounds may be used. Both the solid and liquid epoxy compounds may be used in combination. For example, it is possible to list glycidyl ether-type epoxy resin obtained by reaction between bisphenol A, bisphenol F or bisphenol AD and epichlorohydrin; novolak-type epoxy resin obtained by epoxidizing novolak resin obtained by condensing or co-condensing phenols such as orthocresol novolak-type epoxy resin and aldehydes; glycidyl ester-type epoxy resin obtained by reaction between the epichlorohydrin and polybasic acid such as phthalic acid, dimer acid; glycidyl amine-type epoxy resin obtained by reaction between the epichlorohydrin and polyamine such as diaminodiphenylmethane, isocyanuric acid; linear aliphatic epoxy resin obtained by oxidizing an olefin bond with peracid such as peracetic acid; and alicyclic epoxy resin. These epoxy compounds may be used singly or in combination of not less than two kinds. Of these epoxy compounds, those shown by the following chemical formulas 1 through 7 are favorable. The bisphenol A-type epoxy compound expressed by the chemical formula 1 shown below or the bisphenol F-type epoxy compound expressed by the chemical formula 2 shown below are more favorable because these epoxy compounds have a high solubility.

[Chemical formula 1]

[Chemical formula 2]

[Chemical formula 3]

[Chemical formula 4]

[Chemical formula 5]

[Chemical formula 6]

[Chemical formula 7]

"R" in the chemical formulas 3 and 7 denotes a hydrogen atom or an alkyl group such as a methyl group. "n" in the chemical formulas 4 and 7 denotes integers not less than 1, favorably 1 to 10, and more favorably 1 to 5.

In the grease composition of the present invention, the mixing ratio of the epoxy compound to 100 parts by weight of the base grease consisting of the base oil and the thickener both described later is set to 0.05 to 10 parts by weight and favorably 0.1 to 5 parts by weight. When the mixing ratio of the epoxy compound is less than 0.05 parts by weight, it is impossible to effectively prevent the hydrogen brittleness-caused peeling from occurring on the rolling surface. When the mixing ratio of the epoxy compound is more than 10 parts by weight, the reaction between the epoxy compound and the urea-based thickener is easy to occur, and the peeling-preventing effect lowers.

As the base oil which can be used in the present invention, it is possible to list mineral oil such as spindle oil, refrigeration oil, turbine oil, machine oil, dynamo oil; hydrocarbon synthetic oil such as highly refined mineral oil, liquid paraffin, polybutene, GTL base oil synthesized by Fischer-Tropsh method, poly-α-olefin oil, alkylnaphthalene, alicyclic compounds; and non-hydrocarbon synthetic oil such as natural fats and oils, polyol ester oil, phosphate ester oil, polymer ester oil, aromatic ester oil, carbonate ester oil, diester oil, polyglycol oil, silicone oil, polyphenyl ether oil, alkyldiphenyl ether oil, alkylbenzene oil, fluorinated oil. These base oils can be used singly or in combination of not less than two kinds.

Of these base oils, it is preferable to use the alkyldiphenyl ether oil or the poly-α-olefin oil excellent in the heat resistance and the lubricating property thereof.

As thickeners that can be used in the present invention, it is possible to use soaps such as Benton, silica gel, fluorine compounds, lithium soap, lithium complex soap, calcium soap, calcium complex soap, aluminum soap, aluminum complex soap; and urea-based compounds such as a diurea compound, a polyurea compound, and the like. Of these thickeners, the urea-based compound is favorable in consideration of heat resistance, cost, and the like.

The urea-based compound is obtained by a reaction between an isocyanate compound and an amine compound. To prevent a reactive free radical from remaining, it is preferable to use the isocyanate group of the isocyanate compound and the amino group of the amine compound in an approximately equivalent weight. In the present invention, to prevent the free amino group from remaining, it is preferable to use the isocyanate compound in not less than the equivalent weight.

The diurea compound is obtained by a reaction between diisocyanate and monoamine. As the diisocyanate, phenylene diisocyanate, tolylene diisocyanate, diphenyl diisocyanate, diphenylmethane diisocyanate, octadecane diisocyanate, decane diisocyanate, and hexane diisocyanate are listed. As the monoamine, octylamine, dodecylamine, hexadecylamine, stearylamine, oleylamine, aniline, p-toluidine, and cyclohexylamine are listed.

The polyurea compound is obtained by reaction between diisocyanate and monoamine as well as diamine. As the diisocyanate and the monoamine, substances similar to those used to form the diurea compound are listed. As the diamine, ethylenediamine, propanediamine, butanediamine, hexanediamine, octanediamine, phenylenediamine, tolylenediamine, xylenediamine, and diaminodiphenylmethane are listed.

By adding the thickener such as the urea-based compound to the base oil, it is possible to obtain the base grease to which the epoxy compound or the like is added. The base grease containing the urea-based compound as its thickener is produced by the reaction between the isocyanate compound and the amine compound in the base oil.

As the mixing ratio of the thickener to the base grease, favorably 1 to 40 parts by weight of the thickener and more favorably 3 to 25 parts by weight thereof is added to 100 parts by weight of the base grease. If the content of the thickener is less than one part by weight, the thickening effect is small and greasing is difficult. If the content of the thickener is more than 40 parts by weight, obtained grease is so hard that it is difficult to obtain a desired effect.

As may be necessary, known additives for grease can be contained together with the epoxy compound in the grease composition. As additives that can be added to the base grease, it is possible to use an antioxidant such as an organic zinc compound, a phenol series compound; a metal-inactivating agent such as benzotriazole; a viscosity index improver such as polymethacrylate and polystyrene; a solid lubricant such as molybdenum disulfide and graphite; a corrosion inhibitor such as metal sulfonate and polyalcohol ester; a friction-reducing agent such as organic molybdenum; an oily agent such as ester and alcohol; and a wear-preventing agent such as a phosphorous compound. These additives can be added to the grease singly or in combination.

The grease composition of the present invention is capable of restraining the hydrogen brittleness-caused peculiar peeling. Therefore it is possible to prolong the life of the grease-enclosed bearing. Thus the lubricant composition of the present invention can be used for a ball bearing, a cylindrical roller bearing, a tapered roller bearing, an automatic belt-training roller bearing, a needle-shaped roller bearing, a thrust cylindrical roller bearing, a thrust tapered roller bearing, a thrust needle-shaped roller bearing, and a thrust automatic belt-training roller bearing.

Figure 1:
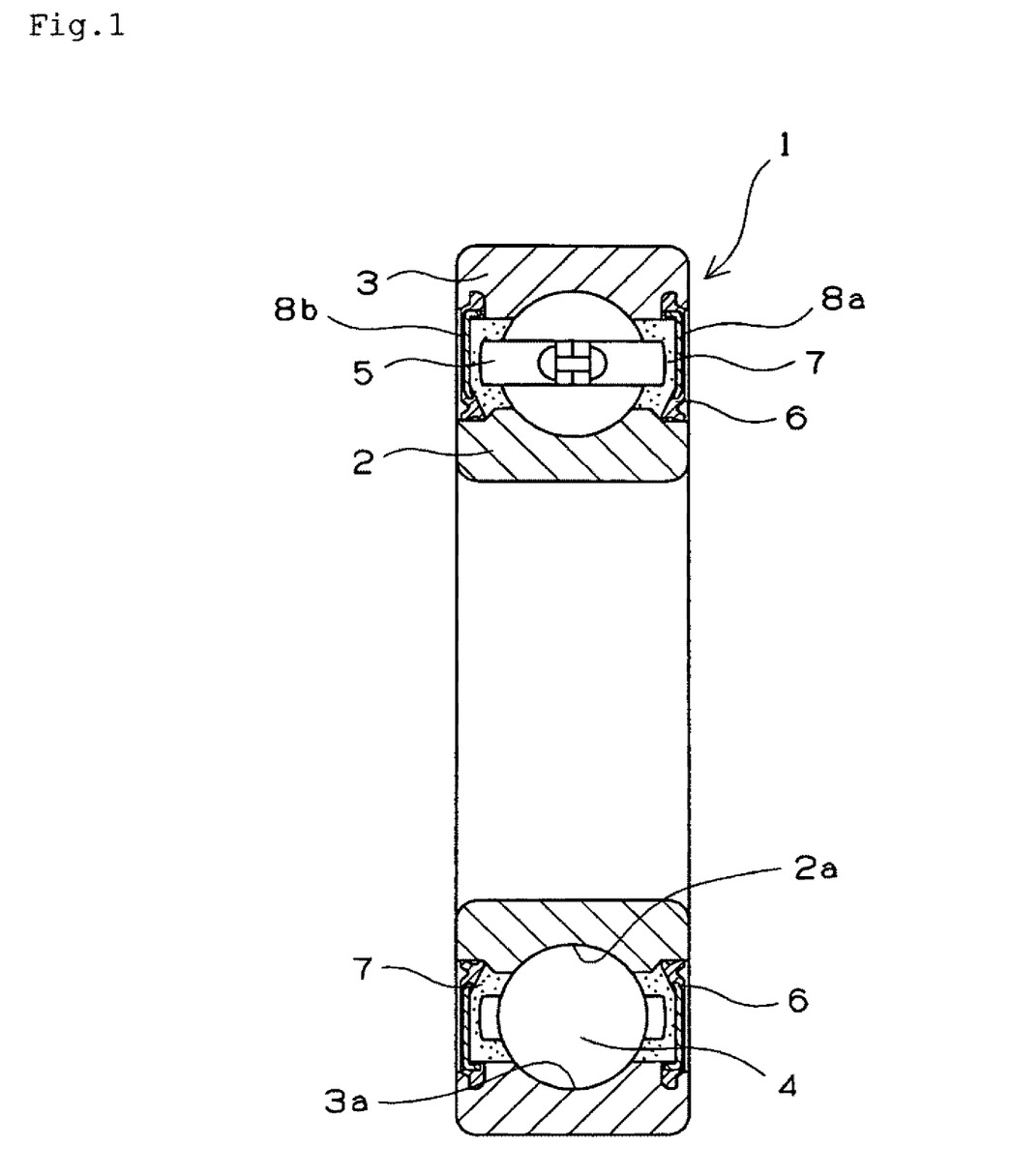
FIG. 1 is a sectional view of a grease-enclosed bearing (deep groove ball bearing).

The grease-enclosed bearing in which the grease composition of the present invention is enclosed is described with reference to FIG. 1. FIG. 1 is a sectional view of a deep groove ball bearing.

In a grease-enclosed bearing 1, an inner ring 2 having an inner ring rolling surface 2a on its peripheral surface and an outer ring 3 having an outer ring rolling surface 3a on its inner peripheral surface are concentrically disposed, and a plurality of rolling elements 4 is disposed between the inner ring rolling surface 2a and the outer ring rolling surface 3a. A retainer 5 holding the plurality of rolling elements 4 is provided. A sealing member 6 covering openings 8a and 8b disposed at both axial ends of the inner ring 2 and the outer ring 3 is fixed to the outer ring 3. A grease composition 7 of the present invention is essentially applied to the peripheries of the rolling elements 4.

Figure 2:
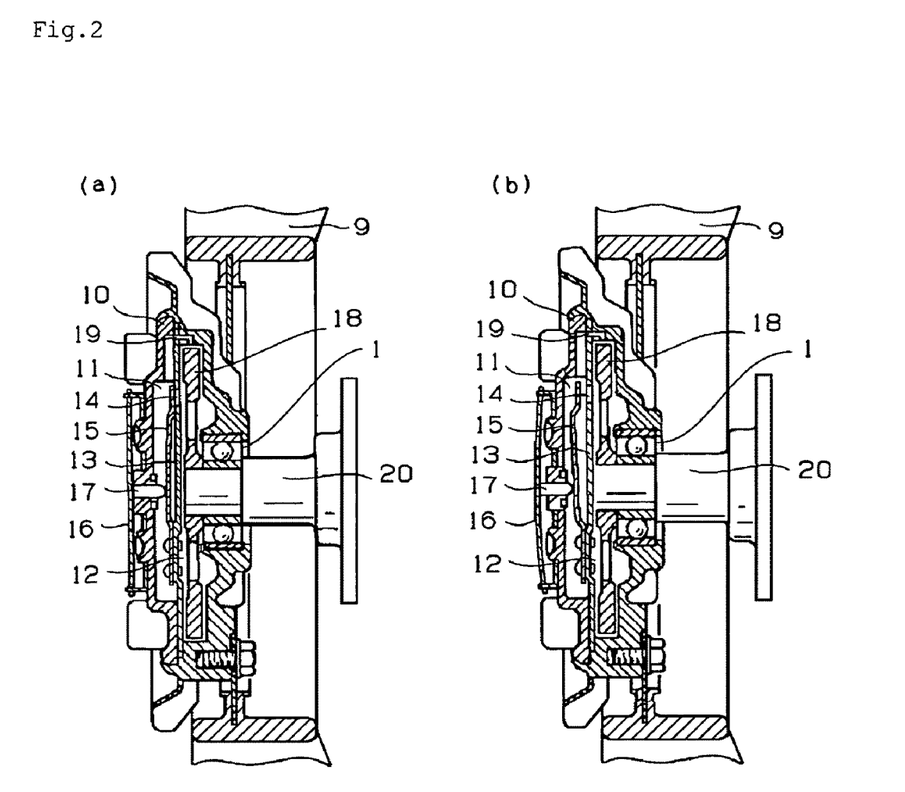
FIG. 2 is a sectional view of the construction of a fan coupling apparatus.

FIGS. 2(a) and 2(b) show an example of an electric auxiliary machine of a car. FIGS. 2(a) and 2(b) are sectional views of a fan coupling apparatus. Inside a casing 10 supporting a cooling fan 9 of the fan-coupling apparatus, there are provided an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13.

A bimetal 16 is mounted on a front surface of the casing 10. A piston 17 of the spring 15 is provided on the bimetal 16. When the temperature of air that has passed through a radiator is not more than a set temperature, for example, 60° C., the bimetal 16 becomes flat. As a result, the piston 17 presses the spring 15, and the spring 15 closes the port 14. When the temperature of the air exceeds the set temperature, the bimetal 16 curves outward as shown in FIG. 2(b). As a result, the piston 17 does not press the spring 15. Thus the spring 15 deforms elastically and opens the port 14.

Supposing that the temperature of the air that has passed through the radiator is lower than the set temperature of the bimetal 16 when the fan-coupling apparatus having the above-described construction is operated, as shown in FIG. 2(a), the viscous fluid inside the oil chamber 11 does not flow into the stirring chamber 12 because the port 14 is closed with the spring 15. At this time, the viscous fluid inside the stirring chamber 12 is fed from a circulation hole 19 formed on the partitioning plate 13 into the oil chamber 11 owing to a rotation of the drive disk 18. Therefore the amount of the viscous fluid inside the stirring chamber 12 becomes slight. Because a shear resistance of the viscous fluid generated owing to the rotation of the drive disk 18 becomes small, a decreased torque is transmitted to the casing 10. Thus the fan 9 supported by the rolling bearing 1 rotates at a low speed.

When the temperature of the air that has passed through the radiator exceeds the set temperature of the bimetal 16, as shown in FIG. 2(b), the bimetal 16 curves outward, and the piston 17 does not press the spring 15. At this time, the spring 15 deforms elastically in a direction in which the spring 15 moves away from the partitioning plate 13. Thus the port 14 is opened. Thereby the viscous fluid inside the oil chamber 11 flows into the stirring chamber 12 from the port 14. Therefore the shear resistance of the viscous fluid generated owing to the rotation of the drive disk 18 becomes large. Thus an increased rotational torque is transmitted to the casing 10, and the fan 9 supported by the rolling bearing rotates at a high speed.

As described above, since in the fan-coupling apparatus, the rotational speed of the fan 9 changes in dependence on the change of temperature, warming-up is made fast, and overcooling of cooling water is prevented. Thereby the engine can be effectively cooled. When the temperature of the engine is low, the fan 9 is placed in a state in which the fan 9 is disconnected from a driving shaft 20. On the other hand, when the temperature of the engine is high, the fan 9 is placed in a state in, which the fan 9 is connected to the driving shaft 20. As such, the rolling bearing 1 is used in a wide range from a low temperature to a high temperature and a wide range of rotation.

Figure 3:
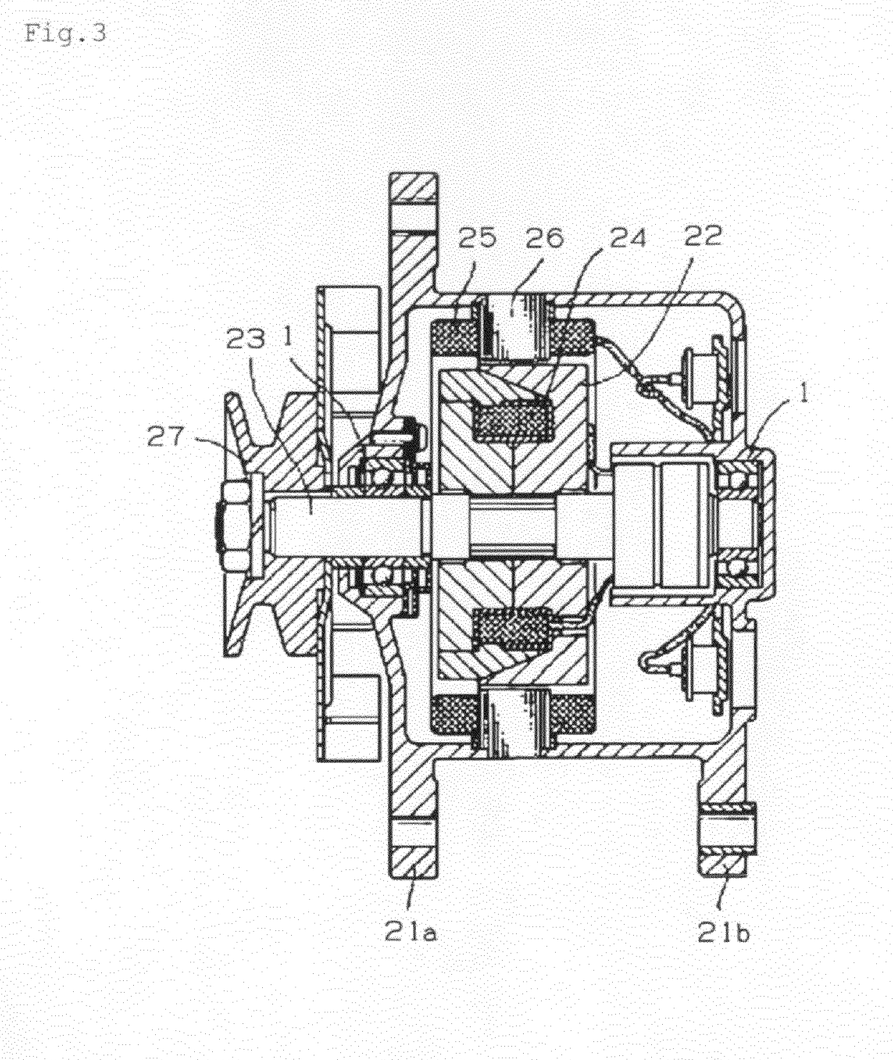
FIG. 3 is a sectional view of the construction of an alternator.

FIG. 3 shows an example of the construction of an alternator of an electric auxiliary machine of a car. FIG. 3 is a sectional view of the alternator. In the alternator, through a pair of rolling bearings 1, a rotating shaft 23 on which a rotor 22 is mounted is rotatably supported by a pair of stationary frames 21a and 21b which form a housing. A rotor coil 24 is mounted on the rotor 22. Three stator coils 26 are mounted at a phase of 120 degrees on a stator 25 disposed on the periphery of the rotor 22.

A rotational shaft 23 of the rotor 22 is driven by a rotational torque transmitted to a pulley 27 mounted on the front end thereof through a belt (not shown in FIG. 3). The pulley 27 is mounted on the rotational shaft 23 in a cantilevered state. Vibrations are generated when the rotational shaft 23 rotates at a high speed. Thus a grease-enclosed rolling bearing 1 supporting the pulley 27 is subjected to a very high load.

Figure 4:
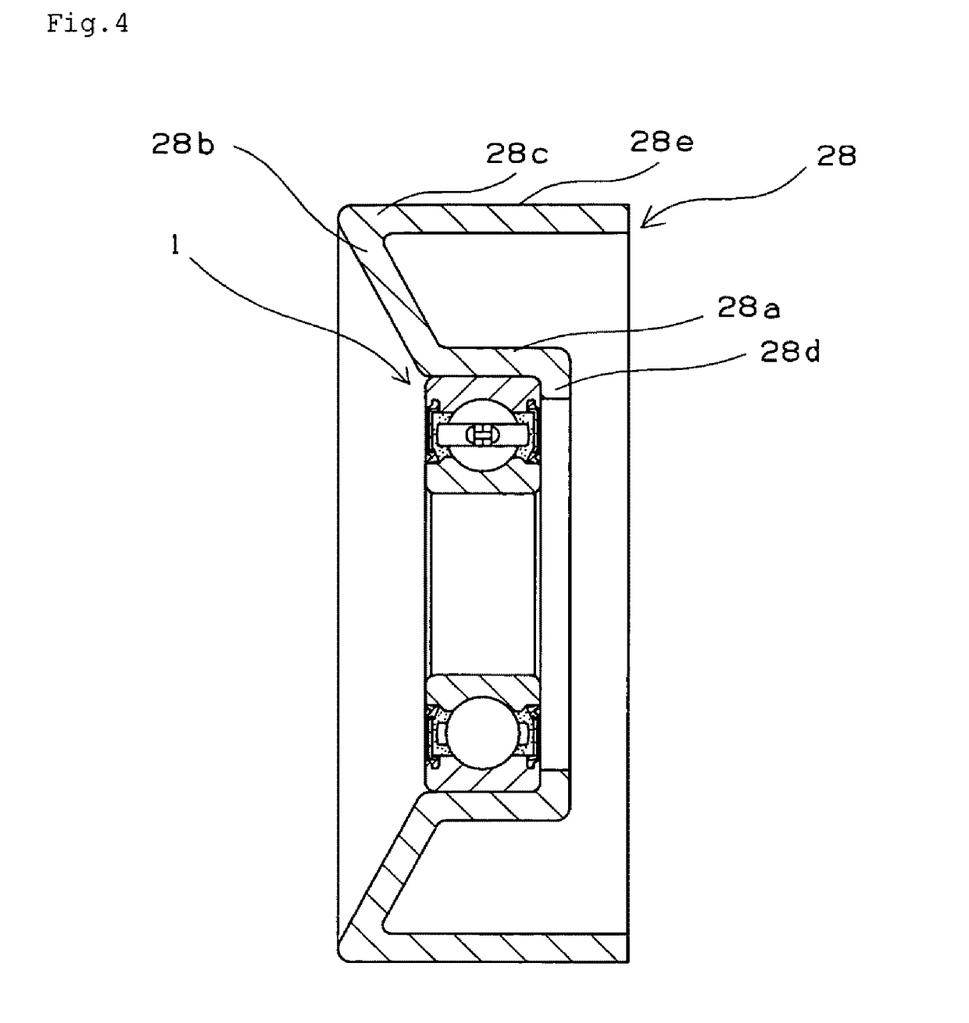
FIG. 4 is a sectional view of the construction of an idler pulley.

FIG. 4 shows an example of an idler pulley used as a belt tensioner which tensions a belt for driving the auxiliary parts of the car. FIG. 4 is a sectional view showing the construction of the idler pulley.

The pulley is constructed of a body 28 made of a steel plate press and a single-row rolling bearing 1 fitted on the inner periphery of the body 28. The body 28 is an annular body constructed of an inner cylindrical part 28a, a flange part 28b extending from one end of the inner cylindrical part 28a to the periphery of the body 28, an outer cylindrical part 28c extending axially from the flange part 28b, and a collar 28d extending from the other end of the inner cylindrical part 28a to the inner periphery of the body 28. An outer ring 3 of the grease-enclosed rolling bearing 1 shown in FIG. 1 is fitted on the inner periphery of the inner cylindrical part 28a. A peripheral surface 28e that contacts a belt driven by the engine is provided on the periphery of the outer cylindrical part 28c. The peripheral surface 28e is brought into contact with the belt to allow the pulley to serve as an idler.

The grease-enclosed bearing of the present invention can be also utilized as the rolling beating to be incorporated in an inverter-driving motor for controlling the operation of an inverter. In the rolling bearing of the inverter-driving motor, the rolling surface thereof may be subjected to damage called "electrolytic corrosion" which occurs because high-frequency electric current flows through the inverter-driving motor from an inverter circuit. In relation to this problem, it is considered that as described above, the film of the epoxy polymer is formed on the rolling surface of the grease-enclosed bearing of the present invention and that this film is capable of preventing the occurrence of the electrolytic corrosion from occurring on the rolling surface of the bearing when electric current flows through the inverter-driving motor.

EXAMPLES

Examples 1 Through 7

4,4'-diphenylmethane diisocyanate (MillionateMT (commercial name) produced by Nippon Polyurethane Industry Co., Ltd., hereinafter referred to as MDI) was dissolved in one half of a base oil shown in table 1 at a ratio shown in table 1. Monoamine was dissolved in the remaining half of the base oil at an equivalent weight two times larger than that of the MDI. The mixing ratio of each of the MDI and the monoamine is as shown in table 1.

The solution in which the monoamine was dissolved was added to the solution in which the MDI was dissolved while the solution in which the MDI was dissolved was being stirred. The stirring continued for 30 minutes at 100 to 120° C. for reaction to form a diurea-based compound in the base oil.

The epoxy compound and an antioxidant were added to the base oil at mixing ratios shown in table 1. The base oil was stirred at 100 to 120° C. for 10 minutes. Thereafter the base oil was cooled and homogenized by a three-roll mill to obtain a grease composition.

In table 1, as synthetic hydrocarbon oil and alkyldiphenyl ether oil both used as the base oil, Shin-fluid 601 (commercial name), produced by Nippon Steel Chemical Co., Ltd., which has a kinematic viscosity of 30 mm$^2$/second at 40° C. and MorescoHilubeLB100 (commercial name), produced by Matsumura Oil Research Corp., which has a kinematic viscosity of 97 mm$^2$/second at 40° C. were used respectively. As the antioxidant, hindered phenol produced by Sumitomo Chemical Co., Ltd. was used.

A sudden acceleration/deceleration test was conducted on the obtained grease compositions. The test method and the test condition are shown below. The results are shown in table 1.

<Sudden Acceleration/Deceleration Test>

An alternator which is an example of an electric auxiliary machine was simulated. The grease composition of each of the examples was enclosed in a rolling bearing, supporting a rotating shaft of the alternator, an inner ring of which rotated to conduct a sudden acceleration/deceleration test. The condition of the sudden acceleration/deceleration test was that as the drive condition, a load of 1960N was applied to a pulley mounted on the tip of the rotational shaft, and the rotational speed was set to 0 to 18000 rpm. The test was conducted in a state in which electric current of 0.1 A flowed through specimen bearings. The time (lifetime h limited by occurrence of peeling) when a generator stopped because peculiar peeling occurred inside the each bearing and the vibration of a vibration detector exceeded a predetermined value was measured. The test was conducted for not more than 500 hours.

Comparative Examples 1-1 Through 3

In a method similar to the method of the example 1, base grease was prepared by selecting a thickener and a base oil at mixing ratios shown in table 1 and in addition, adding an additive to the base grease to obtain a grease composition of each comparative example. A test was conducted on the obtained grease compositions in a manner similar to that of the example 1 to evaluate the grease compositions. Results are shown in table 1.

TABLE 1

|  | Example | | | | | | | Comparative example | | |
|---|---|---|---|---|---|---|---|---|---|---|
|  | 1 | 2 | 3 | 4 | 5 | 6 | 7 | 1 | 2 | 3 |
| Components of grease composition and mixing ratios (part by weight) Base grease Base oil | | | | | | | | | | |
| Synthetic hydrocarbon oil[1] | — | 15 | 63 | 15 | 15 | 15 | 15 | 15 | 15 | 15 |
| Alkyldiphenyl ether oil[2] | 80 | 63 | 15 | 63 | 63 | 63 | 63 | 63 | 63 | 63 |
| Thickener | | | | | | | | | | |
| Amine:Octylamine | — | — | — | 5.8 | — | — | — | — | — | — |
| Amine:p-toluidine | 9.2 | 10.1 | 10.1 | 4.9 | 10.1 | 10.1 | 10.1 | 10.1 | 10.1 | 10.1 |
| Diisocyanate:MDI[3] | 10.8 | 11.9 | 11.9 | 11.3 | 11.9 | 11.9 | 11.9 | 11.9 | 11.9 | 11.9 |
| Total of parts by weight of components | (100) | (100) | (100) | (100) | (100) | (100) | (100) | (100) | (100) | (100) |
| Additive | | | | | | | | | | |
| Antioxidant[4] | 1 | 1 | 1 | 1 | 1 | 1 | 1 | 1 | 1 | 1 |
| Epoxy compound[5] | 1 | 1 | 1 | 1 | 0.1 | 5 | — | — | 0.02 | 15 |
| Epoxy compound[6] | — | — | — | — | — | — | 1 | — | — | — |
| Lifetime limited by occurrence of peeling, h | >500 | >500 | >500 | 470 | >500 | >500 | >500 | 200 | 200 | 80 |

[1]Produced by Nippon Steel Chemical Co., Ltd., shin-fluid 601, kinematic viscosity at 40° C.:30 mm$^2$/second
[2]Produced by Matsumura Oil Research Corp., Moresco-Hilube LB100, kinematic viscosity at 40° C.:97 mm$^2$/second
[3]Produced by Nippon Polyurethane Industry Co., Ltd., Millionate MT
[4]Hindered phenol
[5]Produced by Japan Epoxy Resins Co., Ltd., Epicoat 828
[6]Produced by Japan Epoxy Resins Co., Ltd., Epicoat 807

As shown in table 1, in the sudden acceleration/deceleration test of each example, excellent results of not less than 470 hours (lifetime limited by occurrence of peeling) were shown. It is considered that because the epoxy compound was added to each base grease at the predetermined ratio, the peculiar peeling could be effectively prevented from occurring on the rolling with the rolling surface turning into white in its texture.

INDUSTRIAL APPLICABILITY

The grease composition of the present invention is capable of effectively preventing the hydrogen brittleness-caused peculiar peeling from occurring on the rolling surface with the rolling surface turning into white in its texture and has a long life. Therefore the grease composition can be preferably utilized as grease which is enclosed in the grease-enclosed bearing. The grease-enclosed bearing can be preferably utilized as rolling bearings for electric parts and electric auxiliary machines of a car such as a fan-coupling apparatus, an alternator, an electromagnetic clutch for an air conditioner, an idler pulley, an electromotive fan motor, and the like and as bearings for motors.

The invention claimed is:

1. A grease composition comprising a base grease consisting of a base oil and a thickener and an additive added to said base grease,
    wherein said additive comprises at least one epoxy compound selected from among a bisphenol-A-type epoxy compound and a bisphenol F-type epoxy compound; and a mixing ratio of said epoxy compound to 100 parts by weight of said base grease is set to 0.05 to 10 parts by weight.

2. The grease composition according to claim 1, wherein said thickener is a urea-based thickener.

3. The grease composition according to claim 1, wherein said base oil is at least one oil selected from among alkyldiphenyl ether oil and poly-α-olefin oil.

4. The grease composition according to claim 1, wherein said epoxy compound is added to said base grease to prevent hydrogen brittleness-caused peeling from occurring on a rolling surface of a bearing in which said grease composition is enclosed.

5. A grease-enclosed bearing in which a grease composition is enclosed,
    said grease composition is as claimed in claim 1.

6. The grease-enclosed bearing according to claim 5, which is a rolling bearing, for use in electric parts and auxiliary machines of a car, rotatably supporting a rotational shaft driven by an engine output on a stationary member,
    said grease-enclosed bearing comprising an inner ring and an outer ring; a plurality of rolling elements disposed between said inner ring and said outer ring; and a sealing member for covering openings disposed at both axial ends of said inner ring and said outer ring; and said grease composition is enclosed on peripheries of said rolling elements.

7. The grease-enclosed bearing according to claim 6, wherein said rolling bearing is used for an alternator of a car.

* * * * *